United States Patent
Leidner et al.

(10) Patent No.: US 6,441,091 B1
(45) Date of Patent: Aug. 27, 2002

(54) ERASER

(75) Inventors: Jacob Leidner, Toronto; David G. Cook, Oakville, both of (CA); Luis Rodrigo Pineiro, Bethlehem, PA (US)

(73) Assignee: Binney & Smith, Easton, PA (US)

( * ) Notice: Subject to any disclaimer, the term of this patent is extended or adjusted under 35 U.S.C. 154(b) by 0 days.

(21) Appl. No.: 09/917,109

(22) Filed: Jul. 27, 2001

(51) Int. Cl.[7] .............................................. C08L 53/00
(52) U.S. Cl. ....................... 525/98; 525/90; 525/232; 525/240; 525/241; 524/425; 524/426; 524/427; 524/442; 524/492; 524/81; 15/424
(58) Field of Search .......................... 525/88, 98, 90, 525/260, 232, 241; 524/425, 426, 427, 442, 492; 15/424

(56) References Cited

U.S. PATENT DOCUMENTS

| 2,164,035 A | 6/1939 | Jones |
| 3,738,951 A | 6/1973 | Middlebrook |
| 4,268,411 A | 5/1981 | Iwata et al. |
| 4,350,787 A | 9/1982 | Kimpel |
| 4,374,225 A | * 2/1983 | Kawakubo et al. ......... 524/302 |
| 4,485,520 A | 12/1984 | Handl et al. |
| 4,578,420 A | 3/1986 | Handl |
| 4,796,328 A | 1/1989 | Horie |
| 4,918,130 A | * 4/1990 | Kano et al. ................. 524/499 |

FOREIGN PATENT DOCUMENTS

| DE | 37 23 800 A1 | * 2/1989 | ........... B43L/19/00 |
| DE | 38 10 027 A1 | * 10/1989 | ........... B43L/19/00 |
| EP | 628 433 A1 | * 12/1994 | ........... B43L/19/00 |

* cited by examiner

Primary Examiner—David W. Wu
Assistant Examiner—Rip A Lee
(74) Attorney, Agent, or Firm—RatnerPrestia

(57) ABSTRACT

An eraser composition comprising 22–41 wt % styrene-ethylene/butylene-styrene block copolymer, 5–15 wt % ethylene/propylene copolymer, 30–50 wt % calcium carbonate, 10–25 wt % factice; and 0.1–7 wt % pumice is provided. The eraser composition optionally contains up to 1 wt % titanium dioxide. The eraser composition preferably has a hardness of from 70 to 85 Shore A.

18 Claims, No Drawings

ERASER

FIELD OF INVENTION

The present invention relates to erasers compositions, and more specifically to thermoplastic erasers.

BACKGROUND OF INVENTION

Natural rubber erasers and plastic erasers are generally known. The natural rubber eraser utilizes the natural rubber as a matrix along with factice and a filler. These erasers are often finished by being lightly vulcanized with sulfur. The plastic eraser is generally an emulsion polymerized type of vinyl chloride resin matrix which is mixed with a filler and finished by steam treatment or the like.

Many plastic-based erasers have been developed. One example of the prior art erasers is disclosed in U.S. Pat. No. 4,918,130 which discloses an eraser comprised of a styrene thermoplastic elastomer matrix containing a polyolefin and a hydrocarbon resin. The eraser disclosed in this patent includes the use of certain additives where needed. One such additive disclosed is calcium carbonate, added as a filler. Also disclosed are the use of softeners such as process oils or polybutylene. The eraser of this patent is specifically concerned with erasing plastic crayon marks.

U.S. Pat. No. 4,374,225 discloses a method for manufacturing an eraser containing a low crystallizable polyolefin thermoplastic elastomer and, what the patent describes as, normal synthetic rubbers having no hard segment for crosslinking. Examples of these elastomers, according to the patent, include chlorinated polyethylene, ethylene-propylene termpolymer, ethylene ethyl acrylate, and styrene-butadiene rubber. The eraser disclosed in this patent is asserted to exhibit physical properties similar to a vulcanized rubber but without a vulcanizing operation and subsequent crosslinking. The eraser includes a factice, a filler, and a pigment.

U.S. Pat. No. 4,796,328 discloses an eraser having an integral structure of many eraser pieces, with the different pieces each having different hardnesses and abrasiveness. According to the disclosure, the soft eraser pieces within the eraser deform in conformity with any minute irregularities on the paper surface which leads to close contact of the entire eraser with the paper. In such a case, the abrasive material is forcibly pressed against the paper surface by the harder eraser pieces to scrape out the ink bonded on the paper surface.

Generally, the prior art erasers are concerned with frictional scraping of the mark to be erased. Such a focus lead to the development of erasers, the use of which often results in the abrasion of the surface (typically paper) and concordant unwanted destruction or tearing of the surface. Thus, a need exists for an eraser, which is effective at removing a mark from a surface but which does not tend to abrade or otherwise damage the surface.

SUMMARY OF INVENTION

The present invention provides an eraser in order to solve the problems with the prior art. It has been discovered that a superior eraser comprises 22–41 wt % styrene-ethylene/butylene-styrene block copolymer, 5–15 wt % ethylene/propylene copolymer, 30–50 wt % calcium carbonate, 10–25 wt % factice, and 0.1–7 wt % pumice. The eraser may optionally contain up to wt % titanium dioxide. Preferably, the finished eraser composition should have a hardness of from 70 to 85 Shore A. The calcium carbonate preferably should be dry ground and have a mean particle size of from 6 to 20 microns, with 12 microns being more preferred. The preferred pumice range should be from 2 to 3 wt %

A preferred composition is comprised of 22–41 wt % styrene-ethylene/butylene-styrene block copolymer, 7–9 wt % ethylene/propylene copolymer, 30–50 wt % calcium carbonate, 17–19 wt % factice, 0.1–7 wt % pumice, and 0.1–1 wt % titanium dioxide.

DETAILED DESCRIPTION OF INVENTION

The present invention provides an eraser composition which is comprised of 22–41 wt % styrene-ethylene/butylene-styrene block copolymer, 5–15 wt % ethylene/propylene copolymer, 30–50 wt % calcium carbonate, 10–25 wt % factice, and 0.–7 wt % pumice. The composition may optionally contain up to 1 wt % titanium dioxide. Preferably, the eraser composition should have a hardness of from 70 to 85 Shore A, with a more preferred hardness being from 70 to 80 Shore A. The calcium carbonate preferably should be dry ground and have a mean particle size of from 6 to 20 microns, with 12 microns being more preferred. The preferred pumice range should be from 2 to 3 wt %. A preferred composition is comprised of 22–41 wt % styrene-ethylene/butylene-styrene block copolymer, 7–9 wt % ethylene/propylene copolymer, 30–50 wt % calcium carbonate, 17–19 wt % factice, 0.1–7 wt % pumice, and 0.1–1 wt % titanium dioxide.

The erasers made from the eraser composition of the present invention exhibit excellent effectiveness in removing many types of marks, including pencil, colored pencil, crayon, and ink marks. The eraser works by rubbing the mark with the eraser. Unlike conventional erasers, however, the eraser of the present invention thereby forms a film which adheres to the rubbed mark. This film and the mark that is adhered to it are then rolled, brushed or peeled away as larger slivers or films which have incorporated the erased material.

Where it is intended that the finished eraser composition be used as a pencil top eraser, and where the intended application of the eraser will be on a pencil mark applied to paper, the hardness of the eraser is particularly important. The eraser material must be greater than ~70 Shore A, as below this hardness the eraser cannot be crimped properly on the pencil. With this application, the hardness of the finished eraser composition must also be less than ~80 Shore A, as the eraser can damage the surface of the paper if it is too hard.

As discussed generally above, the eraser composition of the present invention leaves a polymeric film on a surface when the material is pressed against and moved along the surface. The film deposited is quickly and easily peeled from the surface in several large pieces or even one piece. Surfaces against which the film is formed include paper, glass, wood, and other typical household surfaces. It is believed that the film forming ability of the eraser material interacts with the mark when the eraser is rubbed against the mark to be removed and effectively "captures" the mark in the matrix of the eraser material. The mark, once "captured," is easily removed. When the eraser is moved back and forth several times over a mark as done during a typical erasure motion, the film is formed but immediately picked up again as the eraser moves back and forth. The effectiveness of the film forming ability is seen more readily when the eraser material is applied to the surface and wiped only in one direction. What remains is a visible, rubbery film that can be easily peeled away.

While the reason for the effectiveness of the eraser composition may not be fully understood, we have found that the proper combination of ingredients has produced an eraser capable of removing many marks. The composition is comprised of 22–41 wt % styrene-ethylene/butylene-styrene block copolymer, 5–15 wt % ethylene/propylene copolymer, 30–50 wt % calcium carbonate, 10–25 wt % factice, and 0.1–7 wt % pumice. A preferred composition is comprised of 22–41 wt % styrene-ethylene/butylene-styrene block copolymer, 7–9 wt % ethylene/propylene copolymer, 30–50 wt % calcium carbonate, 17–19 wt % factice, 0.1–7 wt % pumice, and 0.1–1 wt % titanium dioxide.

An exemplary styrene-ethylene/butylene-styrene block copolymer is available commercially as Kraton®, with Kraton G-1726 a preferred polymer. ("Kraton" is a registered trademark of Kraton Corporation). Other styrene-butadiene-styrene (SBS) copolymers could work, as long as the proper hardness criteria is met. The stryrene-ethylene/butylene-stryrene block copolymer acts as the main rubbery binder. The preferred hardness for the molded copolymer is within the range of 55 to 65 Shore A, with about 60 Shore A being most preferred. The hardness of this copolymer is increased by the addition of a filler as discussed below. The copolymers used in the present invention are characterized by low cohesive strength (which means that they abrade readily) and low melt viscosity (which helps in film formation). The preferred range of stryrene-ethylene/butylene-stryrene block copolymer is from 22 to 41 wt %, with 32 wt % being most preferred.

Many calcium carbonates would work as a filler, including Omyacarb®, preferably Omyacarb #14, or Snow White® 12 ("Omyacarb" and "Snow White" are registered trademarks of Omya Corporation). Larger particle sized calcium carbonates can be used, but if the particle size gets too large, the eraser made from the composition has a "scratchy" feeling and tends to damage a substrate, particularly paper, more readily during use. The preferred calcium carbonates for use with the present invention are dry ground calcium carbonates with a mean particle size of between 6 and 20 microns, with about 12 microns being most preferred. This filler fulfills several roles, including increasing hardness, acting as an abrasion element, and making the resin abrade the mark to be erased more readily. The preferred range of calcium carbonate is from 30 to 50 wt %, with 39.3 wt % being most preferred.

As noted, dry ground calcium carbonates tend to be more abrasive than wet ground ones. At the same time, even dry ground calcium carbonate is only a mild abrasive and tends not to damage a substrate due to its softness. The terms "dry ground" and "wet ground" refer to the methods by which calcium carbonate has been ground. Wet ground grades are usually whiter, purer, less abrasive and finer. Wet ground grades could also work but dry ground grades are preferred because of their higher abrasiveness.

The particle size of the calcium carbonate particles is important because the use of calcium carbonates which have insufficiently large particle size distribution results in an eraser which is generally ineffective. In addition to being a filler, calcium carbonate also acts as a re-enforcer of the mixture, and larger particle size results in a more abrasive compound which can damage the substrate which is rubbed. Thus, a proper selection of particle size is important to the functionality of the eraser composition.

The factice serves several roles in the final eraser composition, including acting as a plasticizer and also an additive to reduce abrasion resistance. One known factice is a vulcanized oil. A preferred factice is a vulcanized vegetable oil. An exemplary factice is sold by Akrochem Corporation under the name Akrofax®. Preferred Akrofax grades include Akrofax 9970, 758, and 57. Other factice could be used, including VVO factice available from Harwick Chemical Mfg. Corp. The factice serves as a plasticizer, making the eraser material softer, lighter, and more easily processed.

The factice also helps to reduce the cohesive strength of the compound. This reduction in cohesive strength serves both to allow better film formation on the surface rubbed during erasure and also to reduce abrasion resistance of the eraser itself. By reducing abrasion resistance, the eraser material breaks away from itself during rubbing so that the eraser mark can be pulled away from the substrate along with the rubbed-off material. If the eraser material exhibited high abrasion resistance, the mark would attach to the eraser material but the eraser material would stay attached to the rest of the eraser. The result would be an eraser whose surface would be quickly covered with marks. The preferred range of factice is from 10 to 25 wt %, with the more preferred range of factice being from 17 to 19% by weight. 17.8 wt % factice is most preferred.

The ethylene/propylene copolymer is present to improve the "feel" of the eraser product and also help minimize damage to paper when the eraser us rubbed against a mark. Any suitable ethylene/propylene copolymer will work for this purpose, with an exemplary ethylene/propylene copolymer being Exxon's Vistalon®. Generally, it is believed that the presence of ethylene/propylene copolymer increases tack and therefore improves adhesion between the mark being erased and the film formed by the eraser. It also aids in the adhesion of the eraser film to itself, allowing better film-forming ability of the eraser material and ultimately better pick up of the mark after erasure. The preferred range of ethylene/propylene copolymer is from 5 to 15% by weight, with 7 to 9% by weight more preferred and 7.7 wt % most preferred.

Many pumice materials could be used, including Pumice FFFF, available from CR Minerals Corp. Pumice is an aggressive abrasive and is used in small amounts only. It improves abrasion of the mark to be erased (and subsequently pick up by the film forming copolymer) by helping to physically break up and remove particles which would otherwise be difficult to remove. If too much pumice is used the eraser will damage the substrate which holds the mark. The preferred range of pumice is between 0.1 and 7% by weight, with the more preferred amount being between 2 and 3% by weight. The most preferred amount is 2.2 wt %.

The presence of titanium dioxide serves as a whitener. The use of titanium dioxide is optional, and the preferred amount of titanium dioxide is from 0 to 1 wt %.

Several exemplary erasers were developed and analyzed. These erasers are provided in the following table.

| MATERIAL | Weight % | Shore A Hardness |
|---|---|---|
| Styrene-ethylene/butylene-styrene block copolymer | 32.3 | 76 |
| Calcium Carbonate | 39.8 | |
| Factice | 18 | |
| Pumice | 2.2 | |
| Ethylene/propylene copolymer | 7.7 | |
| Styrene-ethylene/butylene-styrene block copolymer | 36.3 | 80 |

-continued

| MATERIAL | Weight % | Shore A Hardness |
|---|---|---|
| Calcium Carbonate | 35 | |
| Factice | 18.5 | |
| Pumice | 2.2 | |
| Ethylene/propylene copolymer | 8.0 | |
| Styrene-ethylene/butylene-styrene block copolymer | 41 | 78 |
| Calcium Carbonate | 30.4 | |
| Factice | 18.4 | |
| Pumice | 2.2 | |
| ethylene/propylene copolymer | 8.0 | |
| Styrene-ethylene/butylene-styrene block copolymer | 26.9 | 83 |
| Calcium Carbonate | 45.1 | |
| Factice | 18 | |
| Pumice | 2.2 | |
| Ethylene/propylene copolymer | 7.8 | |
| Styrene-ethylene/butylene-styrene block copolymer | 22.6 | 77 |
| Calcium Carbonate | 49.7 | |
| Factice | 17.8 | |
| Pumice | 2.1 | |
| Ethylene/propylene copolymer | 7.7 | |

As can be seen, all of the erasers had a Shore A hardness within the range of 70–80, with the exception of the fourth example, which demonstrated a hardness of 83 Shore A. With the exception of this fourth example, all of these formulations would work very well as pencil erasers. The fourth example would work on paper, but its hardness would make it better suited for use on harder surfaces such as wood.

The eraser composition of the present invention can be formed by known extrusion or other molding techniques into conventional eraser shapes. Cylindrical rods can be extruded and cut to become pencil erasers; blocks can be formed and sold as individual hand-held erasers.

A Brabender apparatus with mixing head attachment was used for development of the invented composition. The elements were added to the mixing head at 40 rpm and 150° C., and the speed was then increased to 120 rpm for about 3 minutes. The mixed composition was then removed from the mixing head and compression molded into a ¼ inch×2 inch×2 inch block on a Wabash compression molder at the same temperature for 8 minutes. The block was then cooled to ambient temperature and removed from the mold.

Although the present invention has been particularly described in conjunction with specific preferred embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed is:

1. An eraser composition comprising:
   22–41 wt % styrene-ethylene/butylene-styrene block copolymer;
   5–15 wt % ethylene/propylene copolymer;
   30–50 wt % calcium carbonate;
   10–25 wt % factice; and
   0.1–7 wt % pumice.

2. The eraser composition of claim 1 further comprising up to 1 wt % titanium dioxide.

3. The eraser composition of claim 1 wherein said composition has a hardness of 70 to 85 Shore A.

4. The eraser composition of claim 1 wherein said calcium carbonate is dry ground.

5. The eraser composition of claim 1 wherein said calcium carbonate has a mean particle size of 6 to 20 microns.

6. The eraser composition of claim 1 wherein said calcium carbonate has a mean particle size of 12 microns.

7. The eraser composition of claim 1 wherein said pumice is present at 2 to 3 wt %.

8. An eraser composition comprising:
   22–41 wt % styrene-ethylene/butylene-styrene block copolymer;
   7–9 wt % ethylene/propylene copolymer;
   30–50 wt % calcium carbonate;
   17–19 wt % factice;
   0.1–7 wt % pumice; and
   0.1–1 wt % titanium dioxide.

9. The eraser composition of claim 8 wherein said composition has a hardness of 70 to 85 Shore A.

10. The eraser composition of claim 8 wherein said calcium carbonate is dry ground.

11. The eraser composition of claim 8 wherein said calcium carbonate has a mean particle size of 6 to 20 microns.

12. The eraser composition of claim 8 wherein said calcium carbonate has a mean particle size of 12 microns.

13. The eraser composition of claim 8 wherein said pumice is present at 2 to 3 wt %.

14. An eraser composition comprising:
   32 wt % styrene-ethylene/butylene-styrene block copolymer;
   7.7 wt % ethylene/propylene copolymer;
   39.3 wt % calcium carbonate;
   17.8 wt % factice;
   2.2 wt % pumice; and
   1 wt % titanium dioxide.

15. The eraser composition of claim 8 wherein said composition has a hardness of 70 to 80 Shore A.

16. The eraser composition of claim 8 wherein said calcium carbonate is dry ground.

17. The eraser composition of claim 8 wherein said calcium carbonate has a mean particle size of 6 to 20 microns.

18. The eraser composition of claim 8 wherein said calcium carbonate has a mean particle size of 12 microns.

* * * * *

(12) EX PARTE REEXAMINATION CERTIFICATE (5340th)
United States Patent
Leidner et al.

(10) Number: US 6,441,091 C1
(45) Certificate Issued: Apr. 11, 2006

(54) ERASER

(75) Inventors: Jacob Leidner, Toronto (CA); David G. Cook, Oakville (CA); Luis Rodrigo Pineiro, Bethlehem, PA (US)

(73) Assignee: Binney & Smith, Easton, PA (US)

Reexamination Request:
No. 90/006,887, Dec. 10, 2003

Reexamination Certificate for:
Patent No.: 6,441,091
Issued: Aug. 27, 2002
Appl. No.: 09/917,109
Filed: Jul. 27, 2001

(51) Int. Cl.
*C08L 53/00* (2006.01)

(52) U.S. Cl. .......................... 525/98; 525/90; 525/232; 525/240; 525/241; 524/425; 524/426; 524/427; 524/442; 524/492; 524/81; 15/424

(58) Field of Classification Search ............ 525/98, 525/90, 232, 240, 241; 524/425, 426, 427, 524/442, 492; 15/424
See application file for complete search history.

(56) References Cited

FOREIGN PATENT DOCUMENTS

| EP | 0 334 075 A2 | 9/1989 |
|---|---|---|
| JP | 1-105799 | 4/1989 |

*Primary Examiner*—Peter D. Mulcahy

(57) ABSTRACT

An eraser composition comprising 22–41 wt % styrene-ethylene/butylene-styrene block copolymer, 5–15 wt % ethylene/propylene copolymer, 30–50 wt % calcium carbonate, 10–25 wt % factice; and 0.1–7 wt % pumice is provided. The eraser composition optionally contains up to 1 wt % titanium dioxide. The eraser composition preferably has a hardness of from 70 to 85 Shore A.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–15 is confirmed.

Claims 16–18 are cancelled.

\* \* \* \* \*